UNITED STATES PATENT OFFICE.

PAUL JULIUS, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF GERMANY.

GREEN DYE AND PROCESS OF MAKING SAME.

No. 886,815.　　　Specification of Letters Patent.　　　Patented May 5, 1908.

Application filed February 21, 1907.　Serial No. 358,537.

*To all whom it may concern:*

Be it known that I, PAUL JULIUS, doctor of philosophy and chemist, subject of the Emperor of Austria, residing at Ludwigshafen-on-the-Rhine, Germany, have invented new and useful Improvements in Green Dyes and Processes of Making the Same, of which the following is a specification.

My invention relates to the production of green coloring matters of the triphenylmethane series by condensing a dinitrodiphenylamin disulfonic acid compound as hereinafter defined with an alkylated diamidobenzhydrol, whereupon the coloring matters are obtained in the form of their leuco compounds, these leuco compounds, on oxidation, being converted into the coloring matters proper which dye wool green shades possessing excellent properties, being fast against the action of alkalies, washing, and potting.

The dinitrodiphenylamin disulfonic acid compounds which can be used according to my invention include those obtainable by reacting on metanilic acid with either of the two isomeric dinitrochlorbenzene sulfonic acids $(Cl:NO_2':NO_2:SO_3:H = 1:2:6:4$ and $1:2:4:6)$ and further instead of the above mentioned dinitrochlorbenzene sulfonic acids, derivatives thereof can be employed, and also instead of metanilic acid, derivatives of metanilic acid, in which the para position to the amido group is only occupied by hyrdogen, may be employed, for instance, orthotoluidin-parasulfonic acid and 1-chlor-2-amidobenzene-4-sulfonic acid.

My new coloring matters possess most of the general properties of the green acid triphenylmethane coloring matters, that is to say, they yield green solutions in water and from these solutions dye wool yielding full green shades. Their aqueous solutions turn yellow upon the addition of mineral acid, and the coloring matters themselves yield yellow solutions in concentrated sulfuric acid. They possess, however, the following characteristics which differentiate them from the hitherto known coloring matters, viz., their aqueous solutions are green and turn violet-blue upon the addition of caustic soda in the cold, and further they contain nitro groups the presence of which can be proved in different ways, for instance upon reduction with zinc and acetic acid and upon subsequent oxidation they do not yield back the original coloring matters.

The coloring matter which I wish to be understood as claiming specifically is that obtainable by condesing 2.6-dinitrodiphenylamin-4.3′-disulfonic acid with tetramethyl-diamidobenzhydrol and in particular in the form of its sodium salt it possesses a composition corresponding to the formula.

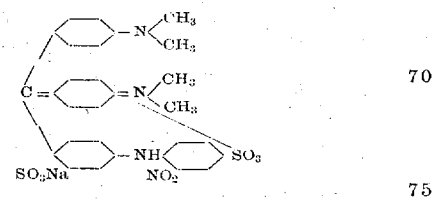

The following Example 1 will help to show how the dinitrodiphenylamin disulfonic acid compounds which are used in my invention can be prepared, and Example 2 shows how my invention can be carried into practical effect, but my invention is not confined to this example. The parts are by weight and the temperatures are given in degrees centigrade.

Example 1. Dissolve two hundred and eighty-two and a half (282.5) parts of 2.6-dinitrochlorbenzene-4-sulfonic acid in seven (7) times its weight of water, and allow a concentrated aqueous solution of one hundred and seventy-three (173) parts of metanilic acid and four hundred and ten (410) parts of crystallized sodium acetate to flow into the hot solution. This addition should extend over a period of about thirty (30) minutes, and the solution should be stirred during the addition. Then boil for about thirty (30) minutes and salt out the dinitrodiphenylamin disulfonic acid formed, by means of potassium chlorid. This new compound can be recrystallized and obtained in the form of fine golden needles which are easily soluble in water. In this example the dinitrochlorbenzene sulfonic acid can be replaced by its aforementioned isomer, and also instead of metanilic acid, a derivative thereof, such for instance as 1-chlor-2-amidobenzene-4-sulfonic acid and orthotoluidin-parasulfonic acid, can be employed.

Example 2. Mix well together forty-nine and a half (49.5) parts of the dipotassium salt of 2.6-dinitrodiphenylamin-4.3'-disulfonic acid and twenty-seven (27) parts of tetramethyldiamidobenzhydrol, and introduce the mixture, at ordinary temperature, during a period of thirty (30) minutes, and while stirring well, into two hundred (200) parts of sulfuric acid monohydrate, whereupon the temperature rises to about fifty (50) degrees. Stir for one (1) hour, pour onto ice, and filter off the yellow crystalline leuco compound which separates out, and press, and dry. This leuco compound consists of an orange-yellow powder which is insoluble in cold water, but easily soluble in dilute sodium carbonate solution and in caustic alkalies. In order to convert it into coloring matter, dissolve thirty-three and three-fifths (33.6) parts thereof and six (6) parts of sodium carbonate in fifteen hundred (1500) parts of water, and cool the solution to about fifteen (15) degrees, and add, while stirring well, first four and three-fifths (4.6) parts of manganese dioxid in the form of a paste, and then sixty-five (65) parts of twenty-five (25) per cent. sulfuric acid. Stir for from three (3) to four (4) hours, boil, and filter the solution, then precipitate the coloring matter from the solution by means of common salt, filter it off, and press, and dry. It dissolves in water yielding a green solution, and dyes wool full green shades. Its aqueous solution, on the addition of mineral acid, assumes a yellow color, and the coloring matter also dissolves in concentrated sulfuric acid yielding a yellow solution.

In a similar manner, coloring matters can be obtained by making use of other alkylated diamidobenzhydrols and also of other dinitrodiphenylamin-disulfonic acids. Further, instead of manganese dioxid, other oxidizing agents, for instance bichromate, can be used.

Now what I claim is:

1. The process of producing coloring matter of the triphenylmethane series by condensing a hereinbefore defined dinitro-diphenylamin-disulfonic acid compound with an alkylated diamidobenzhydrol and oxidizing the resulting leuco compound.

2. The process of producing coloring matter of the triphenylmethane series by condensing 2.6-dinitrodiphenylamin-4.3'-disulfonic acid with tetramethyldiamidobenzhydrol and oxidizing the resulting leuco compound.

3. As new articles of manufacture triphenylmethane coloring matters containing nitro groups, which dye wool from an acid bath full green shades and whose aqueous solutions are green and turn violet-blue upon the addition of caustic alkali in the cold.

4. As a new article of manufacture the triphenylmethane coloring matter which dyes wool from an acid bath full green shades and whose aqueous solution is green and turns violet-blue upon the addition of caustic alkali in the cold and which in the form of its sodium salt possesses a composition corresponding to the formula $$C_{29}H_{26}O_{10}N_5S_2Na.$$

In testimony whereof I have hereunto set my hand in the presence of two subscribing witnesses.

PAUL JULIUS.

Witnesses:
ERNEST F. EHRHARDT,
H. W. HARRIS.

---

It is hereby certified that in Letters Patent No. 886,815, granted May 5, 1908, upon the application of Paul Julius, of Ludwigshafen-on-the-Rhine, Germany, for an improvement in "Green Dyes and Processes of Making Same," an error occurs in the printed specification requiring correction, as follows: In lines 67–75, page 1, the formula 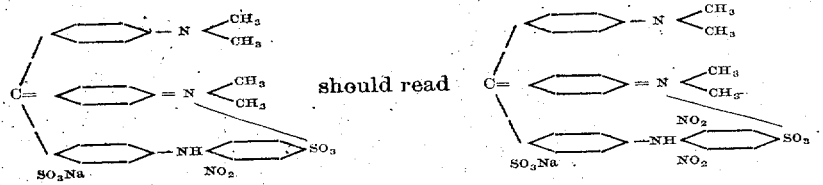 and that the said Letters Patent should be read with this correction therein that the same may conform to the record of the case in the Patent Office.

Signed and sealed this 30th day of June, A. D., 1908.

[SEAL.]

C. C. BILLINGS,
*Acting Commissioner of Patents.*

Example 2. Mix well together forty-nine and a half (49.5) parts of the dipotassium salt of 2.6-dinitrodiphenylamin-4.3'-disulfonic acid and twenty-seven (27) parts of tetramethyldiamidobenzhydrol, and introduce the mixture, at ordinary temperature, during a period of thirty (30) minutes, and while stirring well, into two hundred (200) parts of sulfuric acid monohydrate, whereupon the temperature rises to about fifty (50) degrees. Stir for one (1) hour, pour onto ice, and filter off the yellow crystalline leuco compound which separates out, and press, and dry. This leuco compound consists of an orange-yellow powder which is insoluble in cold water, but easily soluble in dilute sodium carbonate solution and in caustic alkalies. In order to convert it into coloring matter, dissolve thirty-three and three-fifths (33.6) parts thereof and six (6) parts of sodium carbonate in fifteen hundred (1500) parts of water, and cool the solution to about fifteen (15) degrees, and add, while stirring well, first four and three-fifths (4.6) parts of manganese dioxid in the form of a paste, and then sixty-five (65) parts of twenty-five (25) per cent. sulfuric acid. Stir for from three (3) to four (4) hours, boil, and filter the solution, then precipitate the coloring matter from the solution by means of common salt, filter it off, and press, and dry. It dissolves in water yielding a green solution, and dyes wool full green shades. Its aqueous solution, on the addition of mineral acid, assumes a yellow color, and the coloring matter also dissolves in concentrated sulfuric acid yielding a yellow solution.

In a similar manner, coloring matters can be obtained by making use of other alkylated diamidobenzhydrols and also of other dinitro-diphenylamin-disulfonic acids. Further, instead of manganese dioxid, other oxidizing agents, for instance bichromate, can be used.

Now what I claim is:

1. The process of producing coloring matter of the triphenylmethane series by condensing a hereinbefore defined dinitro-diphenylamin-disulfonic acid compound with an alkylated diamidobenzhydrol and oxidizing the resulting leuco compound.

2. The process of producing coloring matter of the triphenylmethane series by condensing 2.6-dinitrodiphenylamin-4.3'-disulfonic acid with tetramethyldiamidobenzhydrol and oxidizing the resulting leuco compound.

3. As new articles of manufacture triphenylmethane coloring matters containing nitro groups, which dye wool from an acid bath full green shades and whose aqueous solutions are green and turn violet-blue upon the addition of caustic alkali in the cold.

4. As a new article of manufacture the triphenylmethane coloring matter which dyes wool from an acid bath full green shades and whose aqueous solution is green and turns violet-blue upon the addition of caustic alkali in the cold and which in the form of its sodium salt possesses a composition corresponding to the formula $$C_{29}H_{26}O_{10}N_5S_2Na.$$

In testimony whereof I have hereunto set my hand in the presence of two subscribing witnesses.

PAUL JULIUS.

Witnesses:
ERNEST F. EHRHARDT,
H. W. HARRIS.

---

It is hereby certified that in Letters Patent No. 886,815, granted May 5, 1908, upon the application of Paul Julius, of Ludwigshafen-on-the-Rhine, Germany, for an improvement in "Green Dyes and Processes of Making Same," an error occurs in the printed specification requiring correction, as follows: In lines 67–75, page 1, the formula

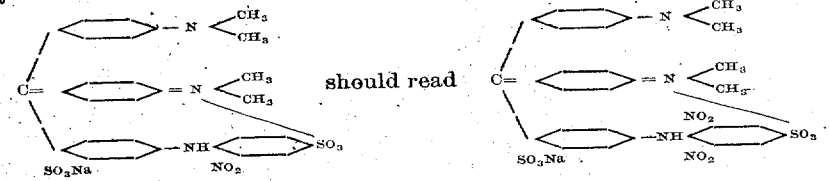

and that the said Letters Patent should be read with this correction therein that the same may conform to the record of the case in the Patent Office.

Signed and sealed this 30th day of June, A. D., 1908.

[SEAL.]

C. C. BILLINGS,
*Acting Commissioner of Patents.*

It is hereby certified that in Letters Patent No. 886,815, granted May 5, 1908, upon the application of Paul Julius, of Ludwigshafen-on-the-Rhine, Germany, for an improvement in "Green Dyes and Processes of Making Same," an error occurs in the printed specification requiring correction, as follows: In lines 67–75, page 1, the formula

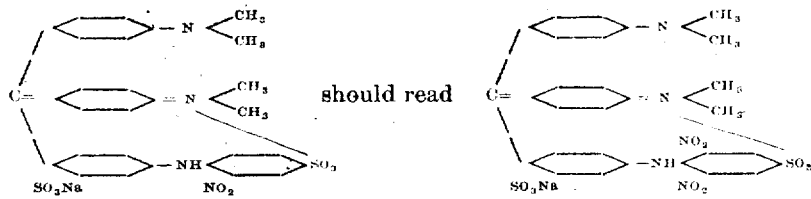

and that the said Letters Patent should be read with this correction therein that the same may conform to the record of the case in the Patent Office.

Signed and sealed this 30th day of June, A. D., 1908.

[SEAL.]

C. C. BILLINGS,
*Acting Commissioner of Patents.*